United States Patent [19]
Szymczak

[11] Patent Number: 5,894,894
[45] Date of Patent: Apr. 20, 1999

[54] CONTROL OF A SEMI-MOUNTED PLOUGH

[75] Inventor: Dominique Szymczak, Beavais, France

[73] Assignee: Massey Ferguson S.A., United Kingdom

[21] Appl. No.: 08/852,697

[22] Filed: May 7, 1997

[30] Foreign Application Priority Data

May 15, 1996 [GB] United Kingdom ............... 9610124

[51] Int. Cl.⁶ ........................................... A01B 69/04
[52] U.S. Cl. ........................................ 172/2; 701/50
[58] Field of Search .................. 172/2–4, 5–7; 701/50

[56] References Cited

U.S. PATENT DOCUMENTS

| | | | |
|---|---|---|---|
| 3,762,480 | 10/1973 | Hofer | 172/4 |
| 4,231,432 | 11/1980 | Jennings | 172/7 |
| 4,518,044 | 5/1985 | Wiegardt et al. | 172/7 |
| 5,031,704 | 7/1991 | Fleischer et al. | 172/6 |
| 5,261,495 | 11/1993 | Szymczak | 172/2 |

Primary Examiner—Christopher J. Novosad
Attorney, Agent, or Firm—MacMillan, Sobauski and Todd

[57] ABSTRACT

A control system for a tractor with a semi-mounted plough (2) hitched to it comprises a control system (13) for setting a delay between the lifting/lowering of the tractor linkage (3) and the rear of the plough (2) to cause the individual ploughshares to enter to leave work along a given line parallel to a field boundary. To accommodate field boundaries which are not perpendicular to the ploughing direction, adjustment values representative of the angle of each field boundary to the ploughing direction may be entered into a control unit (13) to cause the delay between lifting/lowering of the front and rear of the plough to be adjusted automatically as each field boundary is reached to take account of the angle of that boundary and also whether the plough is being taken out of or put into work.

5 Claims, 3 Drawing Sheets

CONTROL OF A SEMI-MOUNTED PLOUGH

BACKGROUND OF THE INVENTION

The present invention relates to a semi-mounted plough control system for an agricultural tractor.

A semi-mounted plough has a support wheel at the center or at the far end on which the plough is supported via a hydraulic cylinder for height adjustment. This means that the height of the near end of the plough, which is mounted on a tractor 3-point linkage and the height of the far end of the plough are controlled by separate hydraulic lines.

It is known, to provide an electronic control system to co-ordinate the lifting and lowering of each end of a semi-mounted plough. Such a system is described fully in U.S. Pat. No. 5,261,495, which is incorporated herein by reference. Using this system, the front end of the plough is caused to enter work before the rear end of the plough so that the diagonally arranged individual ploughshares enter work in the same plane, perpendicular to the direction of travel of the tractor. This makes for even boundaries to the worked area of a field. The same type of control is applied on removing the plough from work.

In the above system, a value is inputted to the control system before ploughing commences which is representative of the length of the plough. The control system uses this value together with the sensed speed of the tractor to determine a time delay between the lowering of the front and rear of the plough into work and a similar time delay between removal of the front and rear of the plough from work. Once the value for the implement length has been input into the control system, it is often not necessary to adjust the settings on the control unit during ploughing. In fact, there are alternative systems which are associated with a particular plough rather than being part of a tractor based control system which will have the implement length value fixed at an appropriate value.

A problem arises, however, when the direction of the furrows is not perpendicular to the field boundaries at each end of the furrows. In this event, to create a neat boundary to the worked area, it is necessary to cause the individual ploughshares to enter work at spaced apart locations with respect to the direction of travel of the tractor to follow the boundary line of the field. It is possible to do this using the known control system, by inputting an adjusted value for the implement length at the beginning of the ploughing operation. This value would be worked out by the operator based on experience so that it takes into account both the actual length of the plough and also the geometry of the field. The problem with this, however, is that this value for "plough length" is only appropriate for one end of the worked area of the field, unless the field boundaries are parallel. Even where the boundaries are parallel, the appropriate "plough length" will be different for entry and exit from work at one end of the field, where a reversible plough is used. Since reversible ploughs are used almost universally now, this means that the "plough length" value needs to be adjusted on every headland turn, at a time when the operator is also having to make a tight turn, change gear and operate lifting/lowering of the linkage. It is difficult for the operator to perform all these functions satisfactorily and this also makes for tiring work because this series of operations has to be performed on every headland turn.

SUMMARY OF THE INVENTION

It is an object of the present invention to alleviate the above and other problems.

According to the invention a system is provided for the control of a semi-mounted plough attached to a tractor linkage, said plough having a support wheel therewith lifting/lowering means associated with, said system comprising:

(a) means for sensing, directly or indirectly, distance travelled by the tractor and plough;

(b) means for operating the lifting/lowering means on travelling a predetermined sensed distance following lifting or lowering of the linkage;

(c) means for storing a parameter representative of the angle between a field worked area boundary and an intended direction of ploughing, and (d) means for adjusting the length of the said predetermined sensed distance travelled in dependence on the said stored angle parameter Preferably, said distance sensing means comprise means for sensing speed of said tractor and plough.

Preferably also, said adjusting means include means for making a count of successive lifting/lowering operations of said linkage and, dependent on said count, making said adjustment negative or positive.

The above feature allows the use of a reversible semi-mounted plough where the angle to the worked area boundary will change according to which direction the tractor is travelling in.

Preferably, said angle parameter storing means include means for storing separate angle parameters representative respectively of angles between opposing worked area boundaries and said intended direction of ploughing.

This feature allows the system to cope with fields with non-parallel headlands.

With the above objective, said adjusting means preferably include means for making a count of successive lifting/lowering operations of said linkage and dependent on said count, determining on which stored angle parameter the magnitude of any adjustment depends.

DESCRIPTION OF THE PREFERRED EMBODIMENT

Figure 1:
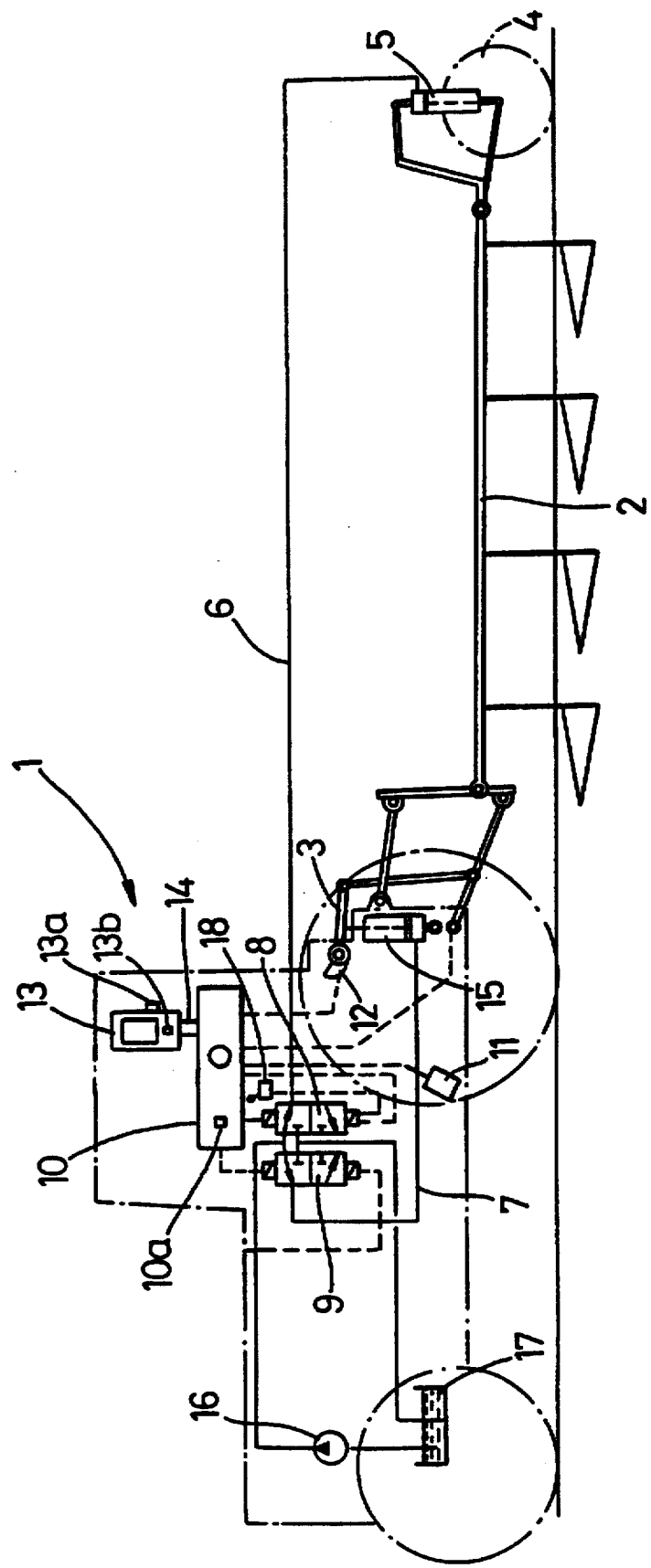
FIG. 1 is a schematic representation of a tractor with a semi-mounted plough attached to it.

Referring to FIG. 1, a tractor 1 has connected up to it a semi-mounted plough 2. The plough 2 is mounted on one end on the tractor three-point linkage 3 and at the other is supported by means of a support wheel 4. In other types of plough, the wheel 4 can be provided towards the center. The plough is liftable and lowerable on the support wheel 4 by means of a hydraulic cylinder 5.

The three-point linkage is raisable and lowerable in a conventional manner by means of hydraulic cylinders 15 whose operation is in turn controlled by an electronic linkage control panel 10 in the tractor cab via an electro-hydraulic valve 9 (or valves). As is conventional, the electro-hydraulic valve 9 is connected electronically to the control panel 10 as shown and is also connected to a source 16 of hydraulic pressure and a hydraulic reservoir 17, as well as to the hydraulic cylinders 15 via lines 7.

The electronic linkage control unit performs the usual linkage control functions known in themselves, including the automatic control of the linkage height based on sensed draft force ("draft control"). It also includes the usual simple linkage raise/lower switch 10a to put an implement mounted on the linkage into work.

The electronic linkage control unit is connected via a CAN network connection 14 to a tractor function display/monitoring unit 13.

The hydraulic cylinder 5 on the rear of the plough is fed from a hydraulic line 6 and the supply of fluid along this line is controlled by an electro-hydraulic valve 8. The valve 8 is connected in a known manner to a source of hydraulic pressure 16 and the hydraulic reservoir 17, and is electronically connected into the electronic linkage control unit, although it could also be connected into the display/monitoring unit 13. It is also operable by a manual lever 18 associated directly with the valve 8.

A linkage position sensor 12 provides an electronic output representative of the linkage position and a tractor speed sensor 11 similarly provides an electronic output representative of tractor ground speed. Both sensors are connected to the electronic linkage control unit 10, although they could equally be connected to the monitoring/display unit 13.

The functioning of the system will now be described. It will be appreciated that certain functions, including input of relevant data are performed using the display/monitoring unit 13 whilst certain other functions are performed by the electronic linkage control unit 10. However, there is no particular reason other than convenience for making this split and the functionality could equally be provided by a single unit or divided differently between the two units.

The semi-mounted plough control system as a whole, incorporating the speed and implement linkage position sensors 11, 12, valves 8, 9, control unit 10 and monitoring/display unit 13, etc functions in four distinct operational modes, described in the following paragraphs.

The first of these modes is "work mode", when the plough is fully engaged in soil. In this mode, the system will control movements of the hydraulic cylinder 5 on the rear of the plough to mirror the movements of the three-point linkage 3, so that the plough is maintained in a horizontal orientation. The 3-point linkage will function in "position control" or "draft control" mode, or a mixture of the two as is conventional.

The second mode of operation is "headland mode". In this mode, the tractor linkage and the wheel support are at a predefined maximum height for transport purposes.

The third mode is "furrow entry mode", which is entered when the linkage raise/lower switch 10a on the electronic control unit 10 is toggled to cause the plough to be lowered into work. In this mode, the front end of the plough, mounted on the tractor linkage, is lowered into work in exactly the same way that a fully mounted plough would be. The rear end of the plough, however, is lowered in two stages: firstly it is lowered to a predefined height just above the ground and then, after a given period of time, it is lowered into work. At that point, the system transfers into work mode.

The fourth mode is "furrow exit mode". This mode is entered when the linkage raise/lower switch 10a is toggled to the "raise" position while the plough is in work. When the switch is toggled, the tractor linkage, and therefore the front of the plough, are raised out of work to the fully raised position as is conventional. As the front of the plough is raised, the rear of the plough is raised slightly with respect to the support wheel. This is to compensate for plough rotation effects, as explained later on. The actual level of the rear of the plough in the ground will stay the same, or raise slightly so that it is still in the ground but at a shallower depth. After a period of time, the rear of the plough is fully raised out of work. The control system then enters headland mode.

Figure 2:
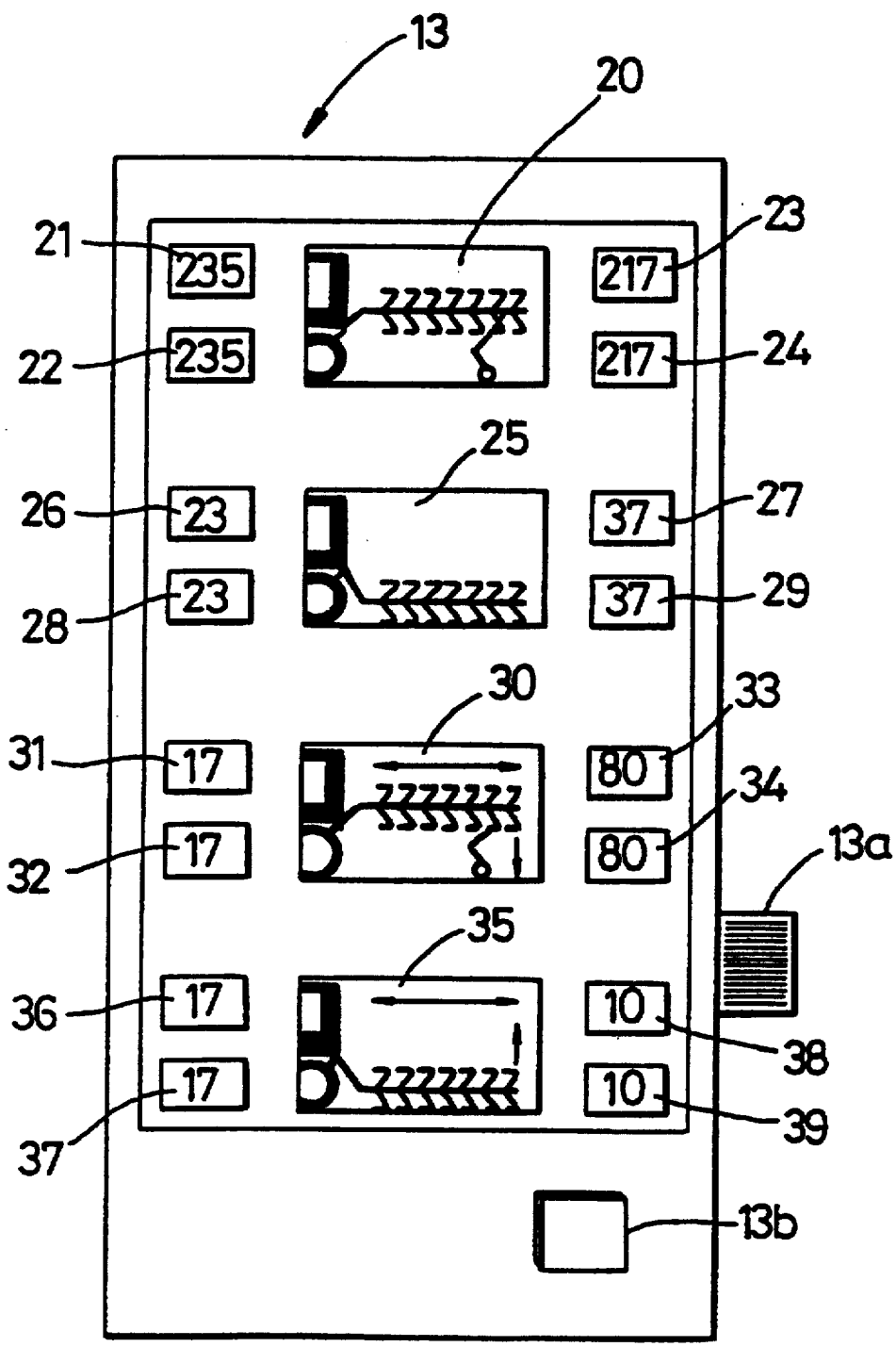
FIG. 2 is an illustration of a display/monitoring unit showing the set-up screen.

Before the control system is used, it needs to be initiated, and this procedure will now be described, with reference to FIG. 2 which is a schematic illustration of the display/monitoring device 13, showing the plough control set-up screen on its multi-function display.

At the top of the screen is an icon 20 showing a semi-mounted plough in a horizontal raised position. To each side of this icon 20 are two windows containing figures. The figure in the upper lefthand window 21 is a stored value for the maximum desired height of the tractor linkage. When the semi-mounted plough is first attached to the tractor, the tractor linkage needs to be raised to an appropriate maximum upper position. As this is being done, the numerical value shown in the lower window 22 will change. When the desired position of the tractor linkage is reached a "save" button 13a is depressed and this value is then stored by the system and transferred to the upper window 21 which indicates the maximum linkage height value currently stored by the system.

The upper and lower windows 23, 24 on the right-hand side of the raised plough icon are used in the same way to set the maximum height for the plough on the support wheel 4. The manual control 18 for the electro-hydraulic valve 8 controlling the hydraulic cylinder 5 on the rear of the plough is adjusted so that the cylinder 5 is fully extended and the rear of the plough is at its maximum height. As this is being done, the value in the lower window, 24 is changing. When the rear of the plough is at its maximum height position, the "save" button 13a is depressed and this value is transferred to the upper window 23 and stored in the control system.

The second icon 25, showing a plough in its lowered position, is used for storing the lowest possible position for the front and rear of the plough in the same way as for the maximum height position. Assuming a reversible plough is fitted, the plough is first rotated into a position where each set of ploughshares projects horizontally, and the tractor linkage control and the manual control on the electro-hydraulic valve 8 are both adjusted so that the front and rear of the plough are in their lowest possible position. The variable values shown in the lower windows 28, 29 on each side of the icon 25 are then saved into the control system, at which time they are also displayed in the respective upper windows 26, 27.

The third icon down on the display, referred to under numeral 30, is used for setting a notional plough length value for use by the system when in furrow entry mode. In practice, this value will not actually in meters or feet, but will simply be a number suitable for the particular plough being used. This value is set using windows 31, 32 on the left-hand side of the icon 30. As previously, the upper window 31 shows the current saved value for plough "entry" length, while the value displayed in the lower window will change as the control 13a on the display/monitoring unit 13 is adjusted. When the desired value is displayed in the lower window, a "save" button 13b is depressed and this value is stored and displayed on the upper window 31. This value will generally be related to the length of the plough, although there may be slight difference between ideal values for different ploughs of the same length. To some extent, the optimum value is best determined by trial and error.

On the right-hand side of the third icon 30 are upper and lower windows 33, 34 showing values for the "partial lowering" of the rear of the plough. As explained above, when the linkage raise/lower switch 10a is toggled to lower the plough into work, the front of the plough is first lowered into work and, at the same time, or shortly afterwards the rear of the plough is partially lowered. A value representative of the height to which the rear of the implement is lowered in this "partially lowered" position is selected using a manual control 13a on the unit 13 and stored, as with the entry length setting.

The fourth icon 35 is for setting another notional value for implement length for use in furrow exit mode (using windows 36, 37 on the left-hand side of icon 35) and also for setting a "partial lift" value using the right-hand windows 38, 39. As explained above, in furrow exit mode, when the raise/lower switch is toggled the front of the plough is first lifted out of work and then simultaneously or shortly afterwards the rear of the plough is partially raised with respect to the support wheel. The "partial lift" value is representative of the amount by which the plough is raised with respect to the support wheel in furrow exit mode.

Figure 3:
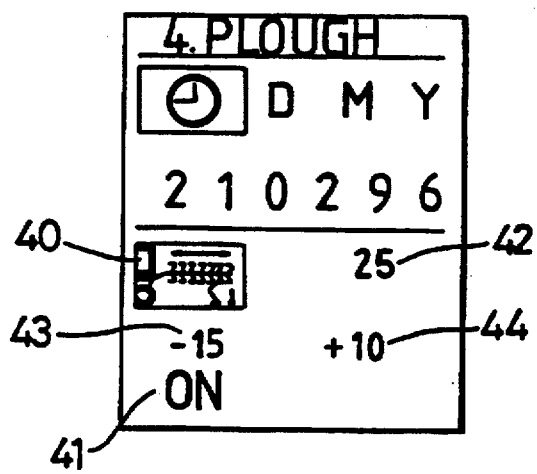
FIG. 3 is an illustration of the semi-mounted plough control system working screen on the display/monitoring unit.

Once the set up procedure is complete, a working screen is called up on the display/monitoring unit 13, as shown in FIG. 3. The upper half of the screen of the unit 13 is shown in FIG. 3 as simply giving the date. This can be altered to a number of other functions, none of which are relevant to the present invention and will be discussed no further. The lower half of the screen is the plough control "working screen". This comprises a semi-mounted plough icon in the top left of the working screen which simply indicates the function of the screen, and an ON/OFF indicator in the bottom left-hand corner which indicates whether the semi-mounted plough control system is active or not. The working screen also comprises three figures 42, 43, 44, whose significance will be explained below.

Once the set-up screen has been gone through, the set up values need not be re-set until the plough is removed. However, each time the tractor electronics are powered up, it is necessary specifically to activate semi-mounted plough control mode by going to the working screen and depressing a button (not shown) on the unit 13 to change the ON/OFF indicator to ON. Once this is done, the semi-mounted plough control system assumes that the tractor is positioned on a field headland with the linkage and the wheel support in the maximum height position.

The figure 42 in the top right-hand corner of the screen is a value from 0-99 representative of the support wheel height. The figures 43, 44 on the left and right center portion of the working screen represent adjustments to the plough length value determined by the geometry of the field, in particular the angle between the desired ploughing direction and the field headlands. Let us consider firstly the case where each of these values is set to zero, as will be the case when the working screen is first entered after setting the system up. This setting would be appropriate for ploughing a field where the furrows are to be perpendicular to the headlands at each end. In this case, the operator simply toggles the linkage raise/lower switch on the linkage control unit when it is desired to put the plough into work. The system will then enter furrow entry mode and the supply of hydraulic fluid to the support wheel cylinder will be automatically controlled so that the rear of the plough first descends to a partially lowered position and then, after a time delay determined by the plough "entry" length value stored by the system, is lowered into work. As the next headland is approached, the operator again toggles the linkage raise/lower switch, the front of the plough is lifted out of work while the rear of the plough is raised slightly to the "partially raised" position. Then after a time delay determined by the implement length "exit" value, the rear of the plough will be removed from work. The system is then in headland mode as the tractor turns through 180° to start the next set of furrows. The procedure is then gone through again using exactly the same values for plough "exit" length and plough "entry" length.

Figure 4:
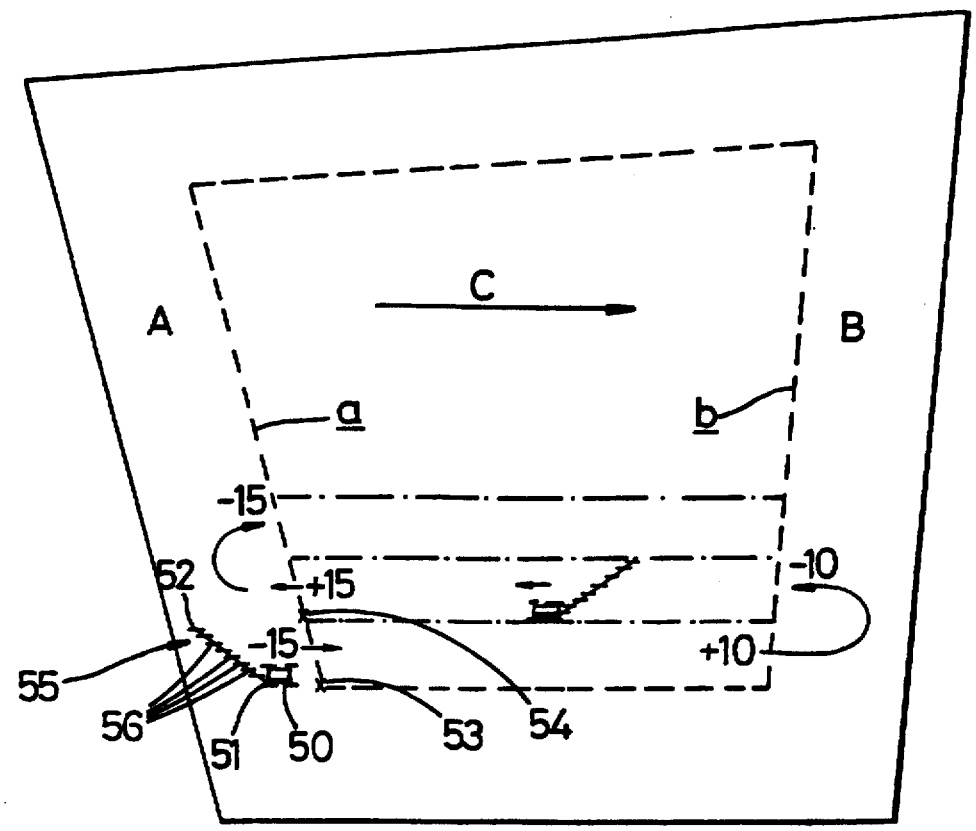
FIG. 4 is a diagrammatic representation of a ploughing operation in an irregular field.

FIG. 4 shows a more normal irregular field with headlands A, B non-perpendicular to the ploughing direction C.

Let us return now to the situation where the working screen has just been entered on the unit 13 and the semi-mounted plough control system activated such that the ON/OFF indicator 41 shows ON in the bottom left-hand corner of the working screen. As explained above, at this stage the system will assume that the tractor is positioned on a headland. A plough length adjustment values 43, 44 will be set to zero, and the left-hand value will be highlighted (not shown) in FIG. 3. FIG. 4 shows desired worked area boundaries a and b, parallel to the respective field boundaries. When the tractor 50 moves from headland A in direction C across the desired worked area boundary a, the front 51 of the plough 55 will cross the worked area boundary a at the point 53 and the rear 52 of the plough 55 will cross the worked area boundary a at point 54. The point 54 is nearer to the rear 52 of the plough than it would be if the boundary a were perpendicular to the ploughing direction C. Accordingly, if the individual ploughshares 56 are all to enter work along the desired worked area boundary line a rather than the rear ploughshares entering work to the right of the boundary a in FIG. 4, the rear of the plough must be lowered earlier.

In the above-described circumstances, the figure 43 on the working screen may be adjusted from zero to an appropriate negative value whose magnitude reflects the magnitude of the obtuse angle made by the desired worked area boundary a to the ploughing direction C. If the line a were at an acute angle to direction C then of course a positive value would be input. In practice, the value is input by rotating the control 13a on the side of the unit 13.

Once a suitable value has been set in headland mode, the operator moves the tractor off, toggles the linkage raise/lower switch 10a and the front of the plough then enters work followed by the rear of the plough, after an appropriately adjusted time delay. The system then enters work mode.

As soon as the system has entered work mode, the highlighting on the working screen shifts from figure 43 to figure 44 on the right-hand side. This figure represents the adjustment which is required to be made to the plough exit length value to compensate for the angle of the desired worked area boundary b at headland B. As can be seen from FIG. 4, in this case the adjustment will need to be a positive one because if the last ploughshare is to exit work later on the boundary line b, it needs to exit work later than it would normally do. Whilst ploughing the first furrow the operator has ample time to adjust the control on the side of the display unit 13 to cause the highlighted right-hand figure 44, representing the adjustment for headland B, to change to an appropriate value.

As the end of the furrow is reached, the raise/lower switch is toggled and the front of the implement is lifted out of work followed after a suitable time delay by the rear of the plough. The tractor then enters headland mode. At this point, the system automatically causes the sign of the right-hand figure 44 (the B headland figure) to change. This is necessary because, if a reversible plough is used as is almost universal these days, the angle which the plough makes with the direction of travel of the tractor will change when the plough is reversed. Of course, if a non-reversible plough is used, the sign change would not be necessary. In a modification of this embodiment, an option is provided for disabling this sign reversing function.

Returning to the main embodiment, referring to FIG. 4, at headland B, on re-entry into work, the rear of the plough will cross the desired worked area boundary b later than it would if the line b were perpendicular to the ploughing direction and hence the negative value for the adjustment. The angle of the line b of course remains the same, however, and therefore the magnitude of the adjustment need not change.

Once the plough has entered into work with the time delay between lowering of the front and rear of the plough adjusted accordingly, the system then enters work mode again. Once work is entered, the highlighting on the working screen shifts back to the left-hand, A headland, figure 43 but again the sign of this figure changes to take into account the reversed configuration of the plough. In this case, the figure will be a positive one because the rear of the plough needs to be removed from work after it would normally be removed at a perpendicular boundary. Once the plough has been removed from work and headland mode once again entered, the sign of the left-hand, A headland, figure will change back to a negative one and the left-hand figure will remain highlighted. It will of course be this negative left-hand figure which is again used to adjust the plough entry length value in the system on re-entry of the plough into work at boundary line a.

This process continues and at any stage the left or right-hand figures 43, 44 can be simply adjusted by rotating the control 13a on the side of the unit 13 to take into account changes in the angle of the field boundary, so that the angle of the worked area boundary follows that of the actual field boundary.

It will be appreciated that the time delay set by the system in conjunction with sensed speed, amounts to setting the distance travelled between raising/lowering of the three point linkage and raising/lowering of the rear of the plough. In a modification of the main embodiment, a "distance travelled" sensor is employed instead of the speed sensor and the system controls lowering/raising of the rear of the plough after a given sensed distance rather than after a given elapsed time.

Returning to the main embodiment, the four main steps are as follows:

1. On furrow entry at headland A, the system uses the set plough entry length value adjusted by the adjustment figure 43 as entered into the system by the operator.
2. On furrow exit at headland B, the system uses the plough exit length value adjusted by the adjustment figure 44 as entered into the system by the operator.
3. On furrow entry on headland B, the system uses the set plough entry length value, adjusted by the adjustment value 44, with the sign of the adjustment value 44 reversed.
4. On furrow exit at headland A, the system uses the furrow exit length value adjusted by the adjustment value 43, with the sign of the adjustment value 43 reversed.

The system recognises the changes between these four phases by detecting the raising and lowering of the tractor linkage, e.g. from the action of the linkage raise/lower switch on the electronic linkage control unit. If it is desired to set the adjustment values 43, 44 before the ploughing operation commences, this can be easily done simply by raising or lowering and linkage while stationary. The control system will normally take into account tractor speed when setting the time delay between lifting/lowering of the front and rear of the plough, but a time limit is imposed (e.g. seconds) after which the rear of the plough will be raised/lowered, irrespective of tractor speed. This allows this stationary setting of the adjustment values 43, 44. The maximum time limit als has safety implications.

In a modification of this embodiment, a manual control feature is provided to move the system between the four phases, either alternatively or in addition to the automatic "count" of lifting/lowering operations.

Let us turn now to the detail of the implement raising and lowering operations. As has been explained before in furrow entry mode the rear of the plough is first lowered to a partially lowered position at approximately the same time as the front of the plough is lowered into work. As explained previously, this value is set using the set-up screen of the display/monitoring unit 13 using windows 33, 34 on the right-hand side of the third icon 30. Normally this value is set by lowering the whole plough so that it is horizontal with one set of ploughshares just clearing the ground. The idea of this is that the ploughshares will be poised ready to be lowered into work rather than having to drop a great distance. If the rear ploughshares were not poised in this way, an additional time factor would have to be set into the plough entry length figure to allow for the descent of the rear ploughshares from their fully raised position. Another advantage of partially lowering the rear ploughshares before entering work is that it avoids an excessively steep entry angle for the front ploughshares which could result in them digging too deep.

The partial lowering figure also takes into account the rotation effect on a semi-mounted plough when the front of the plough is lowered. This is more pronounced in semi-mounted ploughs with a center wheel rather than a wheel at the rear, but occurs to a certain extent in both types. As the front of the plough is lowered, the plough support wheel acts as a pivot and the rear end of the plough is in fact raised. Accordingly, the setting of the partial lowering value cannot be exactly determined by simply lowering the plough in a parallel position, and to some extent needs to be determined by trial and error.

As explained above, in furrow exit mode the plough is partially raised at the rear when the front is taken out of work. This is for similar reasons to those explained above, namely to avoid rotation effects. As the front of the plough is lifted, the wheel support acts as a pivot and can cause the rear of the plough to be plunged deeply into the soil. This process can also cause the ploughshares to be at an inappropriate angle, which causes the entire plough to "pop" out of the ground too early. The partial lift position thus compensates for rotation and can also be used to set a slightly shallower depth for the rear of the plough during the last few metres of its travel whilst the front of the plough is out of work, to avoid an excessively incorrect angle for the ploughshares.

The advantages of the semi-mounted plough system will in the main be apparent from the above discussion of its operation. However, it should be emphasized that the minimising of "jagged edges" to the worked area of a field is extremely desirable for a number of reasons. Firstly, jagged edges cause wasted work because the area of headland that needs to be ploughed effectively extends from the actual field boundary right up to the furthest part of unworked field from the boundary. The more that "zigzags" can be eliminated, the less work needs to be repeated when ploughing the headlands. Secondly, traction is greatly reduced when driving across a previously ploughed field, and this makes ploughing the "zigzag" areas difficult. Thirdly, it is undesirable to plough an area of field twice since this returns to the surface the grass/weeds etc which had previously been ploughed in on the first run.

With the present system, it is generally possible to achieve a worked area boundary with a "zigzag" of less than one metre in length using a 5, 6 or more furrow semi-mounted plough. This represents a considerable improvement over perhaps the 10 meter zigzag which would be created no electronic control of the plough. Of course the particular advantage of the present system is that this can be achieved for any shape of field rather than only a field with two parallel boundaries.

I claim:

1. A system for the control of a semi-mounted plough attached to a tractor linkage, said plough having a support wheel with lifting/lowering means associated therewith, said system comprising:

(a) means for sensing, directly or indirectly, distance travelled by said tractor and plough;

(b) means for operating said lifting/lowering means on travelling a predetermined sensed distance following lifting or lowering of said linkage;

(c) means for storing a parameter representative of the angle between a field worked area boundary and an intended direction of ploughing;

(d) means for adjusting length of said predetermined sensed distance travelled in dependence on said stored angle parameter.

2. A system according to claim 1, wherein said means for sensing distance comprise means for sensing the speed of said tractor and plough.

3. A system according to claim 1 wherein said means for adjusting includes means for making a count of successive lifting/lowering operations of said linkage and, dependent on said count, making said adjustment negative or positive.

4. A system according to claim 1 wherein said means for staring a parameter includes means to store separate angle parameters representative respectively of the angles between opposing worked area boundaries and said intended direction of ploughing.

5. A system as claimed in claim 4, wherein said means for adjusting includes means for making a count of successive lifting/lowering operations of said linkage and, dependent on said count, determining on which of said stored angle parameters the magnitude of any adjustment depends.

* * * * *